(12) United States Patent
Liu et al.

(10) Patent No.: US 12,501,337 B2
(45) Date of Patent: Dec. 16, 2025

(54) SIGNALING EXCHANGE METHOD, BASE STATION AND APPARATUS

(71) Applicant: DATANG MOBILE COMMUNICATIONS EQUIPMENT CO., LTD., Beijing (CN)

(72) Inventors: Aijuan Liu, Beijing (CN); Nan Yan, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 417 days.

(21) Appl. No.: 17/426,073

(22) PCT Filed: Dec. 20, 2019

(86) PCT No.: PCT/CN2019/127215
§ 371 (c)(1),
(2) Date: Jul. 27, 2021

(87) PCT Pub. No.: WO2020/155922
PCT Pub. Date: Aug. 6, 2020

(65) Prior Publication Data
US 2022/0104092 A1   Mar. 31, 2022

(30) Foreign Application Priority Data

Jan. 31, 2019   (CN) .......................... 201910095596.0

(51) Int. Cl.
*H04W 36/22*   (2009.01)
*H04W 36/00*   (2009.01)
(Continued)

(52) U.S. Cl.
CPC ..... *H04W 36/22* (2013.01); *H04W 36/00698* (2023.05); *H04W 36/00835* (2018.08);
(Continued)

(58) Field of Classification Search
CPC . H04W 36/22; H04W 36/0069; H04W 76/15; H04W 92/20; H04W 36/00835;
(Continued)

(56) References Cited

U.S. PATENT DOCUMENTS

2013/0044704 A1\* 2/2013 Pang ..................... H04W 72/27
370/329
2014/0171140 A1\* 6/2014 Iwabuchi .............. H04W 24/10
455/522

(Continued)

FOREIGN PATENT DOCUMENTS

CN   101765153 A   6/2010
CN   104735638 A   6/2015
(Continued)

OTHER PUBLICATIONS

NTT Docomo, Inc."Load management on X2 and F1", 3GPP TSG-RAN WG3 RAN3-AH-1801, Sophia-Antipolis, France, Jan. 22-26, 2018, total 4 pages, R3-180318.

(Continued)

*Primary Examiner* — Ricky Q Ngo
*Assistant Examiner* — Kabir U Jahangir
(74) *Attorney, Agent, or Firm* — KILPATRICK TOWNSEND & STOCKTON LLP

(57) ABSTRACT

The present disclosure discloses a signaling exchange method, a base station and an apparatus. The method includes exchanging, by a base station information with other base stations, the information containing a list of base stations interfacing with the base station and/or load information of cells under the base stations interfacing with the base station; or the information containing load information, the load information being determined partially according to load-related information of cells under the base station and/or load information of cells under base stations config- (Continued)

ured to establish a dual connection for a terminal and interfacing with the base station.

14 Claims, 3 Drawing Sheets

(51) Int. Cl.
   *H04W 36/08* (2009.01)
   *H04W 76/15* (2018.01)
   *H04W 92/20* (2009.01)
(52) U.S. Cl.
   CPC ........... *H04W 36/08* (2013.01); *H04W 76/15* (2018.02); *H04W 92/20* (2013.01)
(58) Field of Classification Search
   CPC . H04W 36/0027; H04W 36/08; H04W 36/28; H04W 36/0058; H04W 88/08
   See application file for complete search history.

(56) References Cited

U.S. PATENT DOCUMENTS

| | | | |
|---|---|---|---|
| 2015/0222482 A1* | 8/2015 | Matsunaga | H04W 24/02 370/254 |
| 2017/0272219 A1* | 9/2017 | Park | H04B 7/024 |
| 2017/0367024 A1* | 12/2017 | Chiba | H04W 36/22 |
| 2018/0124612 A1* | 5/2018 | Babaei | H04W 16/14 |
| 2018/0176835 A1* | 6/2018 | Park | H04W 74/0808 |
| 2018/0279218 A1* | 9/2018 | Park | H04W 48/20 |
| 2019/0320436 A1* | 10/2019 | Han | H04W 72/53 |
| 2019/0394783 A1* | 12/2019 | Byun | H04W 92/20 |
| 2021/0219204 A1* | 7/2021 | Shi | H04W 36/22 |
| 2024/0349334 A1* | 10/2024 | Babaei | H04W 74/0808 |

FOREIGN PATENT DOCUMENTS

| | | |
|---|---|---|
| CN | 107995651 A | 5/2018 |
| CN | 109041125 A | 12/2018 |
| CN | 110062430 A | 7/2019 |
| WO | 2012009863 A1 | 1/2012 |
| WO | 2014030274 A1 | 2/2014 |
| WO | 2015192578 A1 | 12/2015 |
| WO | 2018127622 A1 | 7/2018 |

OTHER PUBLICATIONS

NTT Docomo, Inc."Further consideration on Load management", 3GPP TSG-RAN WG3 RAN3#99bis, Sanya, China, Apr. 15-20, 2018, total 9 pages, R3-181783.
CATT,"Discussion on Mobility Load Balance in 5G system", 3GPP TSG-RAN WG3 #103, Athens, Greece, Feb. 25-Mar. 1, 2019, total 4 pages, R3-190291.
3GPP TR 36.875 V13.1.0, 3rd Generation Partnership Project; Technical Specification Group Radio Access Network; Evolved Universal Terrestrial Radio Access Network (E-UTRAN); Extension of dual connectivity in E-UTRAN (Release 13), total 37 pages, Sep. 2015.
3GPP TS 36.423 V15.4.0; 3rd Generation Partnership Project; Technical Specification Group Radio Access Network; Evolved Universal Terrestrial Radio Access Network (E-UTRAN); X2 application protocol (X2AP) (Release 15), total 409 pages, Dec. 2018.
CATT,"Support of Mobility Load Balancing over Xn interface", 3GPP TSG-RAN3 Meeting #105, Ljubljana, Slovenia, Aug. 26-30, 2019, total 15 pages, R3-193593.
CATT,"Support of Mobility Load Balancing over X2 interface", 3GPP TSG-RAN3 Meeting #105, Ljubljana, Slovenia, Aug. 26-30, 2019, total 14 pages, R3-193597.

* cited by examiner

--prior art--

--prior art--

SIGNALING EXCHANGE METHOD, BASE STATION AND APPARATUS

CROSS-REFERENCE TO RELATED APPLICATIONS

The present disclosure is a National Stage of International Application PCT/CN2019/127215, filed Dec. 20, 2019, which claims priority to the Chinese Patent Application No. 201910095596.0, filed to China National Intellectual Property Administration on Jan. 31, 2019, and entitled "SIGNALING EXCHANGE METHOD, BASE STATION AND APPARATUS", the entire content of which is incorporated herein by reference.

FIELD

The present disclosure relates to the field of wireless communication, in particular to a signaling exchange method, a base station and an apparatus.

BACKGROUND

The architecture of an RAN (Radio Access Network) side is simple described of as follow.

In a tight interworking scene of an eNodeB (Evolution NodeB) and a gNB (next generation NodeB), there are mainly two cases as follows. A second scene also includes NR (next generation Radio)-NR DC (Next Generation Radio Dual Connectivity).

A) a scene where LTE (Long Term Evolution) is a primary base station and a 5G node is a secondary base station, which are connected to a core network through the LTE base station. FIG. 1 is a schematic diagram of a tight interworking architecture of an eNodeB and gNB connected to an EPC (Evolved Packet Core). Details are shown in FIG. 1.

B) a scene where both the 5G node and the LTE base station are connected to a 5G CN (Core Network). FIG. 2 is a schematic diagram of a tight interworking and NR-RN DC architecture of the eNodeB and gNB connected to 5GC. Details are shown in FIG. 2.

FIG. 3 is a schematic diagram of a process of adding a dual connection during a handover process. Steps related to the present disclosure in the figure are: 13. Data Forwarding, 16a. New Path (split/MCG (Master Cell Group) bearer), and 16b. New Path (split/SCG bearer) as shown in the figure. After a target base station receives a handover request message from a source base station, the target base station determines whether the dual connection needs to be established according to bearer information carried in the handover request message. If the dual connection needs to be established and there is a suitable SCG (Secondary Cell Group) cell, a target MN (master node) will initiate an SN addition process to a target SN (secondary node). After receiving a response from the SN, the target MN sends a handover response message to the source base station. The target MN meets the throughput requirement of UE by establishing the dual connection to the UE (User Equipment).

The prior art has the disadvantage that an existing specification only supports exchange of loads between two base stations, i.e. a source base station can only determine a target cell for handover based on a load of a target base station and cannot consider a scene where the target base station may execute dual connection in a handover process.

SUMMARY

The present disclosure provides a signaling exchange method, a base station and an apparatus. The signaling exchange method, the base station and the apparatus are used for solving problems of signaling exchange, and are further used for solving the problem of making a handover judgment in a scene supporting a dual connection.

In a first aspect, embodiments of the present disclosure provide a signaling exchange method, including:
exchanging information with other base stations, and the information contains a list of base stations interfacing therewith and/or load information of cells under the base stations interfacing therewith; or
the information contains load information, and the load information is determined partially according to load-related information of cells under a base station and/or load information of cells under base stations configured to establish a dual connection for a terminal and interfacing with the base station.

In one embodiment, the information exchanged with other base stations is notified through interface signaling after an X2 interface or an Xn interface is established.

In one embodiment, when the information is exchanged with other base stations though X2 interface signaling, the information is notified through RESOURCE STATUS UPDATE signaling; or,
when the information is exchanged with other base stations through Xn interface signaling, the information is notified through Load Status Report signaling.

In one embodiment, the RESOURCE STATUS UPDATE signaling further includes an IE, and the IE is used for carrying a list of cells under a gNB, and the gNB has X2 connection with the base station and the gNB is configured to perform a dual connection operation.

In one embodiment, the IE is a Neighbor Cell Load Information list.

In one embodiment, the method further includes: establishing a dual connection for a terminal switched in.

In a second aspect, embodiments of the present disclosure provide a base station, including:
a processor configured to read a program in a memory and execute a following process:
exchanging information with other base stations, and the information contains a list of base stations interfacing therewith and/or load information of cells under the base stations interfacing therewith; or the information contains load information, and the load information is determined partially according to load-related information of cells under a base station and/or load information of cells under base stations configured to establish a dual connection for a terminal and interfacing with the base station; and
a transceiver configured to receive and send data under control of the processor.

In one embodiment, the information exchanged with other base stations is notified through interface signaling after an X2 interface or an Xn interface is established.

In one embodiment, when the information is exchanged with other base stations though X2 interface signaling, the information is notified through RESOURCE STATUS UPDATE signaling; or,
when the information is exchanged with other base stations through Xn interface signaling, the information is notified through Load Status Report signaling.

In one embodiment, the RESOURCE STATUS UPDATE signaling further includes an IE, and the IE is used for carrying a list of cells under a gNB, and the gNB has X2 connection with the base station and the gNB is configured to perform a dual connection operation.

In one embodiment, the IE is a Neighbor Cell Load Information list.

In one embodiment, the processor is further configured to read the program in the memory and execute a following process: establishing a dual connection for a terminal switched in.

In a third aspect, embodiment of the present disclosure provide a signaling exchange apparatus, including:

a transceiving device configured to exchange information with other base stations, and the information contains a list of base stations interfacing therewith and/or load information of cells under the base stations interfacing therewith; or the information contains load information, and the load information is determined partially according to load-related information of cells under a local base station and/or load information of cells under base stations configured to establish a dual connection for a terminal and interfacing with the local base station.

In a fourth aspect, embodiments of the present disclosure provide a computer-readable storage medium, and the computer-readable storage medium stores a computer program executing the aforesaid signaling exchange method.

BRIEF DESCRIPTION OF THE DRAWINGS

Accompanying drawings described here are used to provide a further understanding of the present disclosure and constitute a part of the present disclosure. Exemplary embodiments of the present disclosure and descriptions thereof are used to explain the present disclosure, and do not constitute an improper limitation of the present disclosure.

DETAILED DESCRIPTION OF THE EMBODIMENTS

Figure 1:
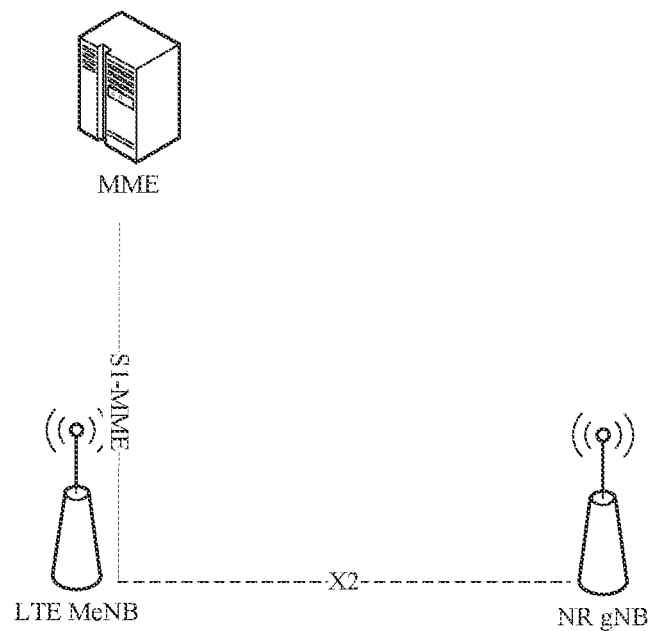
FIG. 1 is a schematic diagram of a tight interworking architecture of an eNodeB and gNB connected to an EPC in the background art.
Figure 2:
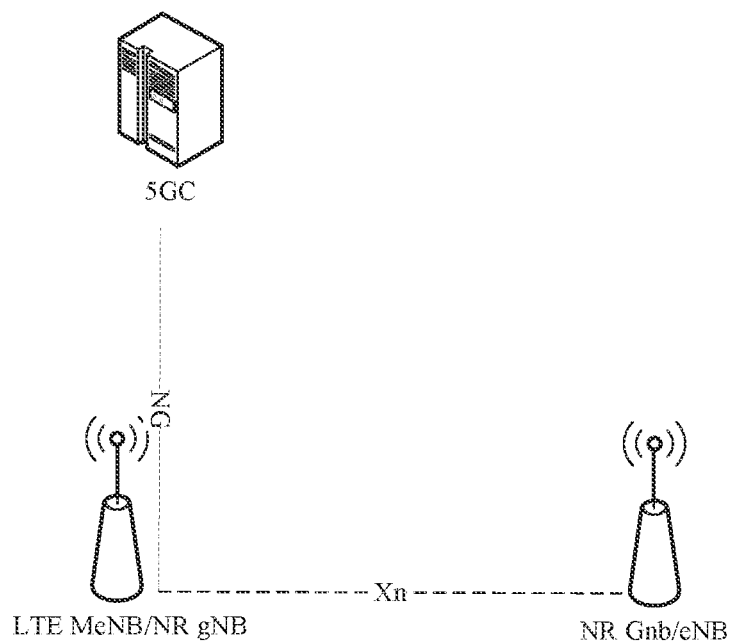
FIG. 2 is a schematic diagram of a tight interworking and NR-RN DC architecture of an eNodeB and gNB connected to a 5GC in the background art.
Figure 3:
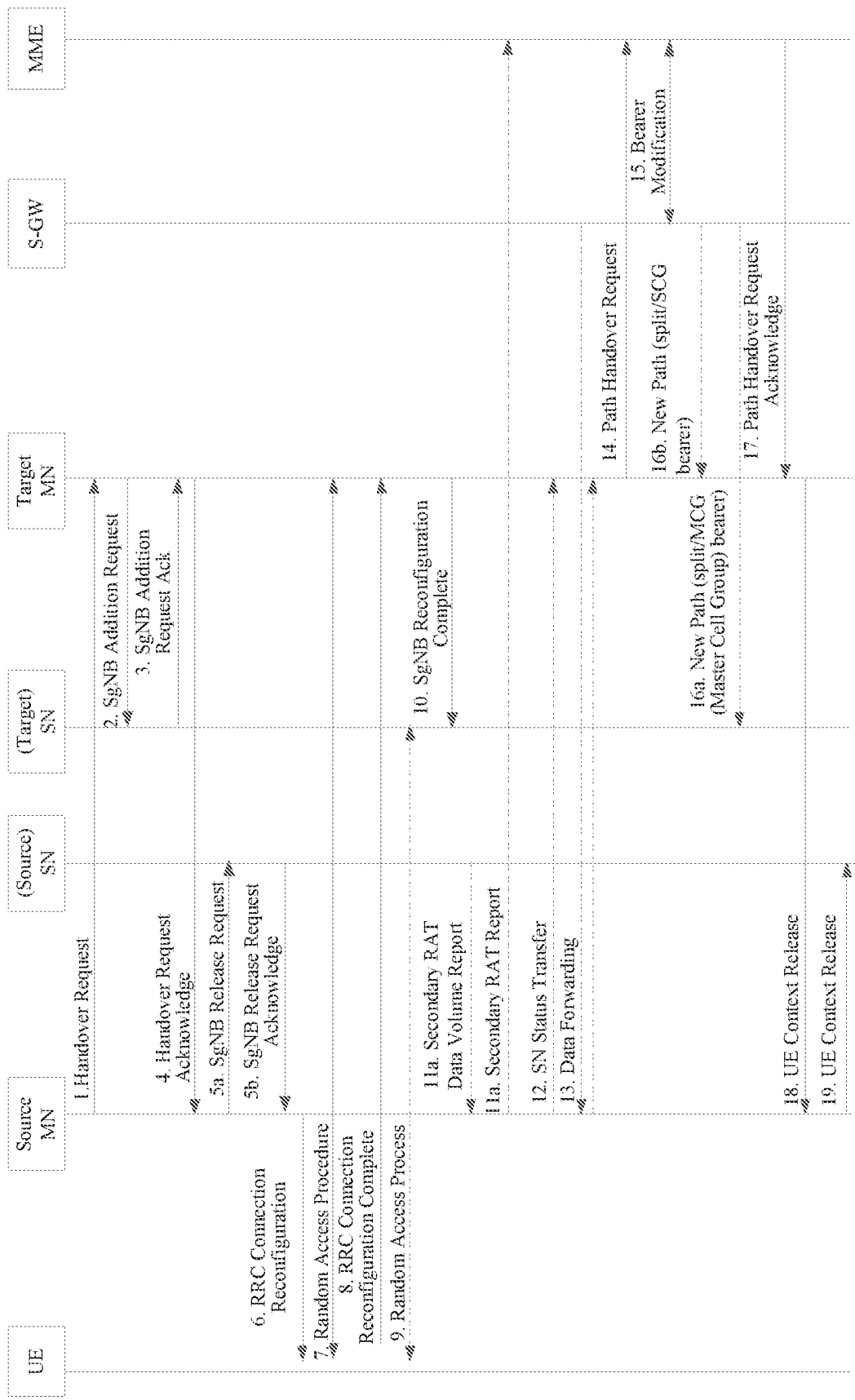
FIG. 3 is a schematic diagram of a process of adding a dual connection during a handover process in the background art.

In the process of the embodiments, the inventor noticed that:

in an LTE system, E-UTRAN is composed of a plurality of eNodeBs, and the eNodeBs are connected with an EPC through S1 interfaces and the eNodeBs are connected through X2 interfaces. In order to support higher data throughout, UE can realize a dual connection through two eNodeBs. In a 5G system, similar to the dual connection in the LTE system, tight interworking of the eNodeBs and gNBs and a dual connection of a gNB and another gNB are supported.

In a handover process, a dual connection can be switched to another dual connection, and a single connection can be switched to a dual connection. Before a source base station initiates handover preparation, the source base station needs to have knowledge of a load of a neighbor cell to ensure that handover is not rejected. However, an existing specification only supports exchange of loads between two LTE base stations, i.e. a source LTE base station can only determine a target cell for handover based on a load of a target LTE base station and cannot consider a scene where the target base station may execute the dual connection in the handover process. Therefore, the present disclosure provides a signaling exchange solution. Implementations of the present disclosure will be described with reference to the drawings.

A signaling exchange method, includes:

exchanging, by a base station, information with other base stations, and the information contains a list of base stations interfacing with the base station and/or load information of cells under the base stations interfacing with the base station; or the information contains load information, and the load information is determined partially according to load-related information of cells under the base station and/or load information of cells under base stations configured to establish a dual connection for a terminal and interfacing with the base station.

The present disclosure has the beneficial effects as follows.

In the embodiments of the present disclosure, due to the fact that cells interfacing with the base station and load information of these cells can be explicitly shown in the process of information exchange, a plurality of pieces of different information are transmitted; or in the process of information exchange, information of the cells interfacing with the base station is comprehensively considered, and only one piece of information is transmitted but information of other cells is comprehensively considered, so that the problem of signaling exchange is solved.

Further, because two base stations not only exchange load information thereof, but also exchange information related to establishing a dual connection for a terminal, when a source base station selects a target cell for handover, the source base station not only considers a load of a neighbor base station, but also considers whether the neighbor base station is configured to establish a dual connection for UE, so higher rate service may be provided for the UE; or for load information exchanged between the two base stations, the load information thereof and the load information of a cell under a gNB which is configured to establishing a dual connection therewith are considered, so that a target base station may be more reasonably selected based on the information in a handover process.

In one embodiment, the information is exchanged with the other base stations, and the information contains the list of the base stations interfacing therewith and/or the load information of the cells under the base stations interfacing therewith; or the exchanged information is the load information of the cell under the base station configured to establish the dual connection for the terminal and interfacing with the base station.

Accordingly, in a first mode, the cells under the base stations interfacing with the base station and the load information of these cells may be explicitly shown in the process of information exchange, and a plurality of different pieces of information are transmitted. In a second mode, in the process of information exchange, the information of the cells interfacing with the cells is comprehensively considered, and only one piece of information is transmitted but information of other cells is comprehensively considered.

In the process of consideration, for instance, a load of the source base station is relatively heavy but a load of a base station which has an interface with the source base is relatively light, so a dual connection may be established for UE switched over. When load information is exchanged with an opposite terminal, a value of a load after comprehensive evaluation may be provided for the opposite terminal.

In the handover process, implementation may be achieved in the following manner.

Figure 4:
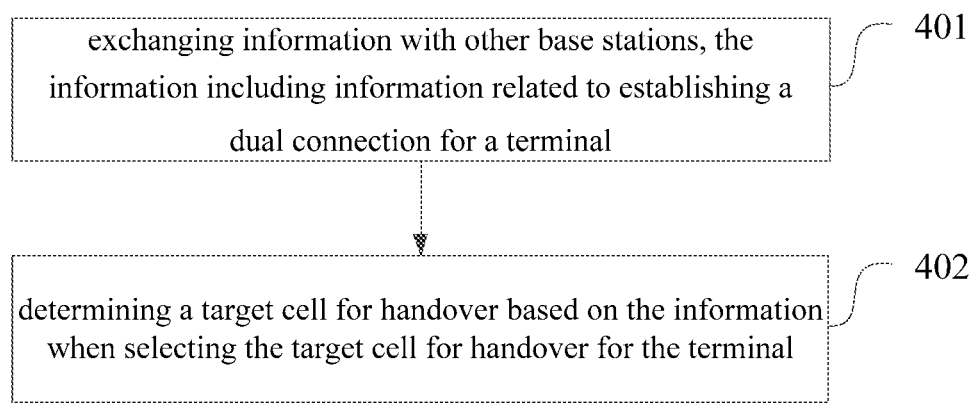
FIG. 4 is a schematic diagram of an implementation process of a handover method in an embodiment of the present disclosure.

FIG. 4 is a schematic diagram of an implementation process of a handover method. As shown in the figure, the process includes:

Step 401, exchanging information with other base stations, the information including information related to establishing a dual connection for a terminal; and Step 402, determining a target cell for handover based on the information when selecting the target cell for handover for the terminal.

In one embodiment, the information related to establishing the dual connection with the terminal includes one of the following information or a combination thereof:

load information of a base station, a list of base stations in X2 or Xn connection therewith, and load information of the base stations in X2 or Xn connection with the base station.

In some embodiments, in one embodiment, two base stations not only exchange the load information thereof, but also exchange the list of the base stations in the X2 or Xn connection with the base stations and the load information of the base stations in the X2 or Xn connection with the base stations. In that way, when a source base station selects a target cell for handover, the source base station not only considers a load of a neighbor base station, but also considers whether the neighbor base station is configured to establish a dual connection for UE, so a higher throughout may be provided for the UE.

Or, for the load information exchanged between the two base stations, the load information thereof and the load information of a cell under a gNB which is configured to establish a dual connection therewith are considered. Therefore, a target base station may be more reasonably selected based on the information in the handover process.

In one embodiment, the information exchanged with other base stations is notified through interface signaling after an X2 interface or an Xn interface is established.

In one embodiment, when the information is exchanged with other base stations though X2 interface signaling, the information is notified through RESOURCE STATUS UPDATE signaling; or, when the information is exchanged with other base stations through Xn interface signaling, the information is notified through Load Status Report signaling.

In one embodiment, the RESOURCE STATUS UPDATE signaling further includes an IE (Information Element), and the IE is used for carrying the list of the cells under the gNB which has X2 connection with the base station and the gNB is configured to perform a dual connection operation of the base station.

In one embodiment, the IE is a Neighbor Cell Load Information list.

In some embodiments, in order to further exchange load information with a neighbor cell, a new IE may be added to a message, i.e. the Neighbor Cell Load Information list, and the list contains the cells under the gNB which is in the X2 connection with a current cell and is configured to perform the dual connection operation.

In one embodiment, the signaling exchange method may further include:

a dual connection is established for a terminal switched in.

In some embodiments, in a handover process, the dual connection may be directly established on a target side, and a Radio Resource Status provided by the RESOURCE STATUS UPDATE is the load of the cell under the gNB with which the dual connection may be established based on comprehensive consideration.

For example, a load of a cell under an eNB1 is in a relatively heavy status, and if only the load of the cell itself is considered, the cell cannot serve as a target cell for handover. However, the load of the cell under the gNB connected with the eNB1 is relatively light, and the eNB1 may consider establishing the dual connection with UE switched in. To achieve the purpose, even if the load of the cell under the eNB1 is relatively heavy, when the cell notifies an opposite terminal of load status of the cell, the cell needs to notify the opposite terminal that more resources is available (considering available resources of the cell under the gNB to which the cell is connected).

Descriptions are made through examples.

Embodiment 1

In the embodiment, after two LTE base stations establish an X2 interface, the two LTE base stations notify each other of their own load condition through interface signaling, and at the same time, the two LTE base stations notify each other of gNBs (located in an overlapping area of the two base stations) with which they are connected through X2 and load condition of the gNBs.

Currently, a process of load information exchange between the two base stations is as follows. Reference may be made to RESOURCE STATUS UPDATE of section 9.1.2.14 in a 3GPP (third generation partnership project) protocol.

A message is sent by an eNB2 to a neighbor eNB1 to report results of requested measurements.

Direction: eNB2→eNB1.

| IE/Group Name | Presence | Range | IE Type and Reference | Semantics Description | Criticality | Assigned Criticality |
|---|---|---|---|---|---|---|
| Message Type | M | | 9.2.13 | | YES | ignore |
| eNB1 Measurement ID | M | | INTEGER (1...4095,...) | Allocated by $eNB_1$ | YES | reject |
| eNB2 Measurement ID | M | | INTEGER (1...4095,...) | Allocated by $eNB_2$ | YES | reject |
| Cell Measurement Result | | 1 | | | YES | ignore |
| >Cell Measurement Result Item | | 1...<max CellineNB> | | | EACH | ignore |
| >>Cell ID | M | | ECGI 9.2.14 | | | |

-continued

| IE/Group Name | Presence | Range | IE Type and Reference | Semantics Description | Criticality | Assigned Criticality |
|---|---|---|---|---|---|---|
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Criticality Group | O | | 9.2.44 | | YES | ignore |
| >>ABS Status | O | | 9.2.58 | | YES | ignore |
| >>RSRP Measurement Report List | O | | 9.2.76 | | YES | ignore |
| >>CSI Report | O | | 9.2.79 | | YES | ignore |
| >>Cell Reporting Indicator | O | | ENUMERATED (stop request, . . .) | | YES | ignore |

| Range Bound | Explanation |
|---|---|
| maxCellineNB | Maximum number of cells that can be served by an eNB. Value is 256. |

In order to further exchange load information with neighbor cells, a new IE, i.e. a Neighbor Cell Load Information List, may be added to the message. The list includes the cells under the gNB which is in X2 connection with the current cell and supports dual connection operation.

The modified message may be defined as follows:

| IE/Group Name | Presence | Range | IE Type and Reference | Semantics Description | Criticality | Assigned Criticality |
|---|---|---|---|---|---|---|
| Message Type | M | | 9.2.13 | | YES | ignore |
| eNB1 Measurement ID | M | | INTEGER (1. . . 4095, . . .) | Allocated by eNB$_1$ | YES | reject |
| eNB2 Measurement ID | M | | INTEGER (1. . . 4095, . . .) | Allocated by eNB$_2$ | YES | reject |
| Cell Measurement Result | | 1 | | | YES | ignore |
| >Cell Measurement Result Item | | 1. . . <maxCellineNB> | | | EACH | Ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Criticality Group | O | | 9.2.44 | | YES | ignore |
| >>ABS Status | O | | 9.2.58 | | YES | ignore |
| >>RSRP Measurement Report List | O | | 9.2.76 | | YES | ignore |
| >>CSI Report | O | | 9.2.79 | | YES | ignore |
| >>Cell Reporting Indicator | O | | ENUMERATED (stop request, . . .) | | YES | ignore |
| >>Neighbor Cell Load Information List | | 0. . . <max Neighbor incell> | | | | |
| >>>Cell ID | M | | | | YES | ignore |
| >>>Radio Resource Status | M | | | | YES | ignore |

| Range Bound | Explanation |
|---|---|
| maxCellineNB | Maximum number of cells that can be served by an eNB. Value is 256. |

Embodiment 2

In the embodiment, after two LTE base stations establish an X2 interface, the two LTE base stations notify each other of their own load condition through interface signaling, and when notifying each other of their own load condition, each of the two LTE base stations comprehensively consider load condition of gNBs with which they are connected to itself through X2.

In embodiment 1, the process of exchange of load information between the two base stations is described. In a handover process, a dual connection may be directly established on a target side, and a Radio Resource Status provided by RESOURCE STATUS UPDATE is a load of a cell under the gNB with which the dual connection may be established based on comprehensive consideration.

For example, a load of a cell under an eNB1 is in a relatively heavy status, and if only the load of the cell is considered, the cell cannot serve as a target cell for handover. However, the load of the cell under the gNB connected with the eNB1 is relatively light, and the eNB1 may consider establishing a dual connection with UE switched in. To achieve the purpose, even if the load of the cell under the eNB1 is relatively heavy, when the cell notifies an opposite terminal of load status of the cell, the cell needs to notify the opposite terminal that more resources is available, i.e. the cell under the eNB1 considers available resources of the cell under the gNB to which the cell is connected.

Embodiment 3

In the embodiment, after two base stations connected to 5GC establish an Xn interface, the two base stations notify each other of their own load condition through interface signaling, and at the same time, the two base stations notify each other of gNBs (located in an overlapping area of the two base stations) with which they are connected through Xn and load condition of the gNBs.

An existing specification does not support exchange of load information through an Xn interface, and in the embodiments, a message may be led in through the Xn interface. For example, a Load Status Report supports exchange of load information.

The message may be defined as follows.

load condition, each of the two base stations comprehensively consider load condition of gNBs with which they are connected through Xn.

In embodiment 3, the process of exchange of the load information between the two base stations connected to 5GC is described. In a handover process, a dual connection may be directly established on a target side, and a Radio Resource Status provided by a Load Status Report which is recommended for leading in is a load of a cell under the gNB with which a dual connection may be established based on comprehensive consideration.

For example, a load of a cell under a gNB1 is in a relatively heavy status, and if only the load of the cell is considered, the cell cannot serve as a target cell for handover. However, the load of the cell under the gNB connected with the gNB1 is relatively light, and the gNB1 may consider establishing a dual connection with UE switched in. To achieve the purpose, even if the load of the cell under the gNB1 is relatively heavy, when the cell notifies an opposite terminal of its load status, the cell needs to notify the opposite terminal that more resources is available, i.e. the cell under the gNB1 considers available resources of the cell under the gNB to which the cell is connected.

Based on the same inventive concept, an embodiment of the present disclosure further provides a base station, a signaling exchange apparatus and a storage medium. Because the principle of problem solving by equipment is similar to a signaling exchange method, for implementation of the equipment, reference may be made to implementation of the method, and repetition will not be made here.

When an embodiment of the present disclosure is implemented, implementation may be achieved in the following manner.

Figure 5:
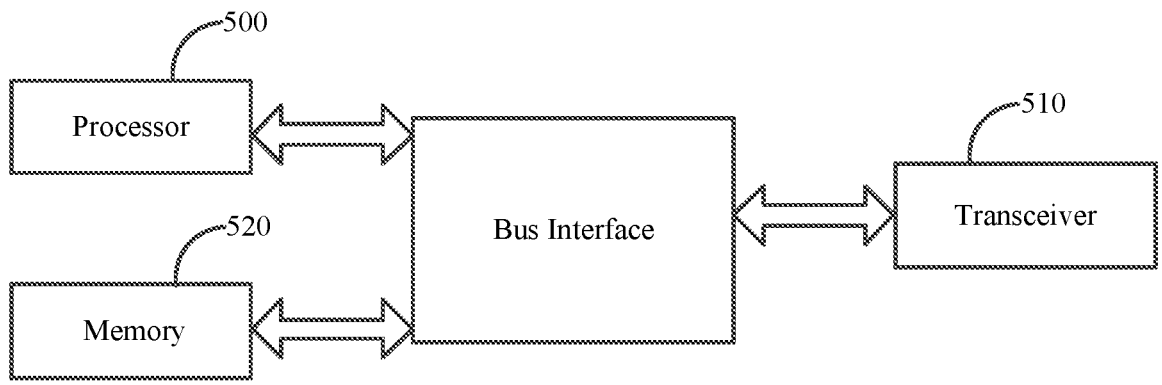
FIG. 5 is a schematic structural diagram of a base station in an embodiment of the present disclosure.

FIG. 5 is a schematic structural diagram of a base station. As shown in the figure, the base station includes:

a processor 500, configured to read a program in a memory 520 and execute the following process:

| IE/Group Name | Presence | Range | IE Type and Reference | Semantics Description | Criticality | Assigned Criticality |
|---|---|---|---|---|---|---|
| Message Type | M | | | | YES | ignore |
| eNB1 Measurement ID | M | | INTEGER (1...4095,...) | Allocated by $eNB_1$ | YES | reject |
| eNB2 Measurement ID | M | | INTEGER (1...4095,...) | Allocated by $eNB_2$ | YES | reject |
| Cell Measurement Result | | 1 | | | YES | ignore |
| >Cell Measurement Result Item | | 1...<max CellineNB> | | | EACH | ignore |
| >>Cell ID | M | | | | | |
| >>Resource status report | O | | | | | |
| >>Neighbor Cell Load Information list | | 0...<max Neighbor incell> | | | | |
| >>>Cell ID | M | | | | YES | ignore |
| >>>Resource status report | M | | | | YES | ignore |

Embodiment 4

In the embodiment, after two base stations connected to 5GC establish an Xn interface, the two base stations notify each other of their own load condition through interface signaling, and when notifying each other of the their own information is exchanged with other base stations, and the information contains a list of base stations interfacing with the base station and/or load information of cells under the base stations interfacing with the base station; or the information contains load information, and the load information is determined partially according to load-related information of cells under the base station and/or load information of cells under base stations configured to establish a dual connection for a terminal and interfacing with the base station; and a transceiver 510, configured to receive and send data under control of the processor 500.

In one embodiment, the information exchanged with other base stations is notified through interface signaling after an X2 interface or an Xn interface is established.

In one embodiment, when the information is exchanged with other base stations though X2 interface signaling, the information is notified through RESOURCE STATUS UPDATE signaling; or, when the information is exchanged with other base stations through Xn interface signaling, the information is notified through Load Status Report signaling.

In one embodiment, the RESOURCE STATUS UPDATE signaling further includes an IE, and the IE is used for carrying a list of cells under a gNB, the gNB has X2 connection with the base station and the gNB is configured to perform a dual connection operation.

In one embodiment, the IE is a Neighbor Cell Load Information list.

In one embodiment, the base station may further include: a dual connection is established for a terminal switched in.

In particular, in FIG. 5, a bus architecture may include any number of interconnected buses and bridges. Specifically, one or more processors represented by the processor 500 and various circuits of a memory represented by the memory 520 are linked together. The bus architecture may also link various other circuits such as peripheral equipment, voltage regulators, power management circuits, etc. The circuits are all known in the art, so that no further description is made herein. A bus interface provides an interface. The transceiver 510 may be a plurality of components including a transmitter and a transceiver, and provides a unit for communicating with various other apparatuses on a transmission medium. The processor 500 is responsible for managing the bus architecture and general processing, and the memory 520 may store the data used by the processor 500 when performing operations.

The embodiments of the present disclosure further provide a signaling exchange apparatus, including:

a transceiving device, configured to exchange information with other base stations, and the information contains a list of base stations interfacing with the base station and/or load information of cells under the base stations interfacing with the base station; or the information contains load information, and the load information is determined partially according to load-related information of cells under the base station and/or load information of cells under base stations configured to establish a dual connection for a terminal and interfacing with the base station.

For specific implementation, reference may be made to implementation of the aforesaid signaling exchange method.

The embodiments of the present disclosure further provide a computer-readable storage medium, and the computer-readable storage medium stores a computer program executing the aforesaid signaling exchange method.

For convenience of description, all parts of the apparatus are divided into different devices or units by functions to be separately described. In implementation of the present disclosure, functions of the devices or units may be realized in one or a plurality of software or hardware.

In conclusion, in the embodiments of the present disclosure, how to make a handover judgment more reasonably in a scene supporting dual connection is described, i.e. not only a load of a peer base station is considered, load condition of base stations which may perform dual connection operations with the peer base station is also considered. Because two base stations not only exchange load information thereof, but also exchange base stations which are in X2/Xn connection with the base stations and load information of the base stations which are in X2/Xn connection with the base stations. Therefore, when a source base station selects a target cell for handover, the source base station not only considers a load of a neighbor base station, but also considers whether the neighbor base station is configured to establish a dual connection for UE, so higher rate service may be provided for the UE. Further, for the load information exchanged between the two base stations, the load information of the base stations itself and the load information of a cell under a gNB which is configured to establish a dual connection with the cell are considered. Therefore, a target base station may be more reasonably selected based on the information in the handover process.

The embodiments of the present disclosure may be provided as a method, a system or a computer program product. Therefore, the present disclosure may adopt the form of a complete hardware embodiment, a complete software embodiment, or an embodiment combining software and hardware. Moreover, the present disclosure may take the form of a computer program product implemented on one or more computer-usable storage media (including but not limited to a disk memory, an optical memory, etc.) containing computer-usable program codes.

The present disclosure is described with reference to a flowchart and/or a block diagram of a method, equipment (a system), and a computer program product according to the embodiments of the present disclosure. It should be understood that each flow and/or block in the flowchart and/or the block diagram, and the combination of the flows and/or the blocks in the flowchart and/or the block diagram may be realized by computer program instructions. The computer program instructions may be provided for a processor of a general-purpose computer, a special-purpose computer, an embedded processor, or other programmable data processing equipment to generate a machine, so that an apparatus that realizes functions specified in one flow or multiple flows in the flowchart and/or one block or multiple blocks in the block diagram may be generated through the instructions executed by the processor of the computer or other programmable data processing equipment.

The computer program instructions may also be stored in a computer-readable memory that can direct a computer or other programmable data processing equipment to work in a specific manner, so that the instructions stored in the computer-readable memory produce a manufactured product including an instruction apparatus. The instruction apparatus implements functions specified in one flow or multiple flows in the flowchart and/or one block or multiple blocks in the block diagram.

These computer program instructions may also be loaded on a computer or other programmable data processing equipment, so that a series of operation steps are executed on the computer or other programmable equipment to produce computer-implemented processing to provide steps for implementing functions specified in one flow or multiple flows in the flowchart and/or one block or multiple blocks in the block diagram through the instructions executed on the computer or other programmable equipment.

What is claimed is:

1. A signaling exchange method, comprising:
exchanging, by a second base station, information with a first base station,
wherein
the information contains load information, and the load information is determined according to load information of cells under a third base station configured to establish a dual connection for a terminal and interfacing with the second base station;
wherein the second base station and the first base station are two LTE base stations or two NR base stations, and the third base station interfacing with the second base station is located within an overlapping area of the two LTE base stations or the two NR base stations.

2. The method according to claim 1, wherein the information exchanged with the first base station is notified through interface signaling after an X2 interface or an Xn interface is established.

3. The method according to claim 2, wherein when the information is exchanged with the first base station though X2 interface signaling, the information is notified through RESOURCE STATUS UPDATE signaling; or,
when the information is exchanged with the first base station through Xn interface signaling, the information is notified through Load Status Report signaling.

4. The method according to claim 3, wherein the RESOURCE STATUS UPDATE signaling further comprises an Information Element (IE), and the IE is used for carrying a list of cells under a next generation base station (gNB), wherein the gNB has an X2 connection with the second base station and the gNB is configured to perform a dual connection operation.

5. The method according to claim 4, wherein the IE is a Neighbor Cell Load Information list.

6. The method according to claim 1, further comprising: establishing a dual connection for a terminal switched in.

7. A second base station, comprising:
a processor configured to read a program in a memory and execute a following process:
exchanging information with a first base station, wherein the information contains load information, and the load information is determined according to load information of cells under a third base station configured to establish a dual connection for a terminal and interfacing with the second base station; and
a transceiver configured to receive and send data under control of the processor;
wherein the second base station and the first base station are two LTE base stations or two NR base stations, and the third base station interfacing with the second base station is located within an overlapping area of the two LTE base stations or the two NR base stations.

8. The base station according to claim 7, wherein the information exchanged with the first base station is notified through interface signaling after an X2 interface or an Xn interface is established.

9. The base station according to claim 8, wherein when the information is exchanged with the first base station though X2 interface signaling, the information is notified through RESOURCE STATUS UPDATE signaling; or,
when the information is exchanged with the first base station through Xn interface signaling, the information is notified through Load Status Report signaling.

10. The base station according to claim 9, wherein the RESOURCE STATUS UPDATE signaling further comprises an IE, and the IE is used for carrying a list of cells under a next generation base station (gNB), wherein the gNB has an X2 connection with the second base station and the gNB is configured to perform a dual connection operation.

11. The base station according to claim 10, wherein the IE is a Neighbor Cell Load Information list.

12. The base station according to claim 7, wherein the processor is further configured to read the program in the memory and execute a following process:
establishing a dual connection for a terminal switched in.

13. A non-transitory computer-readable storage medium, wherein the non-transitory computer-readable storage medium stores a computer program executing the method according to claim 1.

14. A signaling exchange method, comprising:
exchanging, by a second base station, information with a first base station,
wherein the information contains load information, wherein the load information is determined according to load information of cells under a third base station configured to establish a dual connection for a terminal and interfacing with the second base station;
wherein an interface between the second base station and the third base station is an X2 interface or an Xn interface;
when the information is exchanged with the first base station through X2 interface signaling, the information is notified through RESOURCE STATUS UPDATE signaling;
wherein the RESOURCE STATUS UPDATE signaling further comprises an Information Element (IE), and the IE is used for carrying a list of cells under a next generation base station (gNB), wherein the gNB has an X2 connection with the second base station and the gNB is configured to perform a dual connection operation.

* * * * *